US010080084B2

(12) United States Patent
Kidambi et al.

(10) Patent No.: US 10,080,084 B2
(45) Date of Patent: Sep. 18, 2018

(54) DIGITAL CORRECTING NETWORK FOR MICROELECTROMECHANICAL SYSTEMS MICROPHONE

(71) Applicant: Cirrus Logic International Semiconductor Ltd., Edinburgh (GB)

(72) Inventors: Sunder S. Kidambi, Austin, TX (US); John C. Tucker, Austin, TX (US); Aleksey Khenkin, Nashua, NH (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/198,809

(22) Filed: Jun. 30, 2016

(65) Prior Publication Data

US 2017/0180858 A1 Jun. 22, 2017

Related U.S. Application Data

(60) Provisional application No. 62/269,536, filed on Dec. 18, 2015.

(51) Int. Cl.
*H04B 15/00* (2006.01)
*H04R 3/06* (2006.01)
*H04R 29/00* (2006.01)

(52) U.S. Cl.
CPC ............ *H04R 3/06* (2013.01); *H04R 29/004* (2013.01); *H04R 2201/003* (2013.01)

(58) Field of Classification Search
CPC .. H04R 3/06; H04R 29/004; H04R 2201/003; H04R 29/00; H04R 19/04
USPC ........... 381/113, 111, 120, 94.2, 94.3, 98, 97
See application file for complete search history.

(56) References Cited

U.S. PATENT DOCUMENTS

| | | | | |
|---|---|---|---|---|
| 6,166,853 | A * | 12/2000 | Sapia | G02B 21/00 359/559 |
| 9,716,933 | B2 * | 7/2017 | Oliaei | H04R 1/08 |
| 2007/0258597 | A1 | 11/2007 | Rasmussen et al. | |
| 2013/0207827 | A1 * | 8/2013 | Nestler | H03H 15/02 341/172 |
| 2015/0030181 | A1 * | 1/2015 | Kimura | H04R 3/04 381/94.3 |
| 2015/0139432 | A1 * | 5/2015 | Barwicz | H04R 29/00 381/56 |
| 2015/0226557 | A1 * | 8/2015 | Aaltonen | G01C 19/5712 73/504.12 |
| 2016/0241961 | A1 * | 8/2016 | Josefsson | H03G 5/165 |
| 2016/0287870 | A1 * | 10/2016 | Yip | A61N 1/378 |

FOREIGN PATENT DOCUMENTS

EP 1198974 A1 4/2002

OTHER PUBLICATIONS

International Search Report and Written Opinion of the International Searching Authority, International Application No. PCT/US2016/040472, dated Oct. 5, 2016, 10 pages.

* cited by examiner

*Primary Examiner* — Vivian Chin
*Assistant Examiner* — Ubachukwu Odunukwe
(74) *Attorney, Agent, or Firm* — Jackson Walker L.L.P.

(57) ABSTRACT

In accordance with embodiments of the present disclosure, a system may include a digital correcting network for correcting for an intrinsic highpass filter of a microelectromechanical systems (MEMS) microphone such that a combined phase and magnitude response of a cascade of the intrinsic highpass filter and the digital correcting network substantially approximates the response of a target highpass filter.

24 Claims, 4 Drawing Sheets

400

| $f_{3dB}$ (Hz) | K | A ($F_{TARGET}$) | E ($F_{TARGET}$) |
|---|---|---|---|
| 25 | 0.714285711823537 | 0.813733471267171 | 0.106626690080624 |
| 26 | 0.742857144296808 | 0.802743848012238 | 0.0956370668256908 |
| 27 | 0.771428569943863 | 0.791782255617482 | 0.0846754744309344 |
| 28 | 0.800000013034336 | 0.780868809492252 | 0.0737620283057046 |
| 29 | 0.828571425593233 | 0.770021560949674 | 0.062914779763127 |
| 30 | 0.857142855599653 | 0.759256602403516 | 0.0521498212169683 |
| 31 | 0.885714284720606 | 0.748588180204824 | 0.0414813990182769 |
| 32 | 0.914285694089831 | 0.738028812026829 | 0.0309220308402814 |
| 33 | 0.942857146946086 | 0.727589406202322 | 0.0204826250157749 |
| 34 | 0.971428569047705 | 0.717279380867838 | 0.010172599681291 |
| 35 | 1.0 | 0.707106781187087 | 0 |
| 36 | 1.02857142247599 | 0.697078393283101 | -0.0100283879034466 |
| 37 | 1.05714287468046 | 0.6871199853857098 | -0.0199069273294494 |
| 38 | 1.08571430565519 | 0.677475754722657 | -0.0296310264638903 |
| 39 | 1.11428571428641 | 0.667909741737682 | -0.039197039448865 |
| 40 | 1.14285713866781 | 0.658504607817818 | -0.0486021733687297 |
| 41 | 1.17142855521189 | 0.649262379866065 | -0.0578444013204822 |
| 42 | 1.20000000118457 | 0.640184399589943 | -0.0669223815966041 |
| 43 | 1.22857142912187 | 0.631271398283486 | -0.0758353829030612 |
| 44 | 1.25714285659426 | 0.622523565722697 | -0.0845832154638502 |
| 45 | 1.28571429296036 | 0.613940613403176 | -0.0931661677833717 |

FIG. 4

DIGITAL CORRECTING NETWORK FOR MICROELECTROMECHANICAL SYSTEMS MICROPHONE

RELATED APPLICATIONS

The present disclosure claims priority to U.S. Provisional Patent Application Ser. No. 62/269,536, filed Dec. 18, 2015, which is incorporated by reference herein in its entirety.

FIELD OF DISCLOSURE

The present disclosure relates in general to audio systems, and more particularly, to correcting for frequency characteristics of a microelectromechanical systems (MEMS) microphone.

BACKGROUND

Microphones are ubiquitous on many devices used by individuals, including computers, tablets, smart phones, and many other consumer devices. Generally speaking, a microphone is an electroacoustic transducer that produces an electrical signal in response to deflection of a portion (e.g., a membrane or other structure) of a microphone caused by sound incident upon the microphone. To process audio signals generated by a microphone, microphones are often coupled to an audio system.

One type of microphone increasingly used in audio systems is a MEMS microphone. In a MEMS microphone, a diaphragm or membrane having an electrical capacitance may be formed on a semiconductor, such that sound pressure incident upon the capacitive element may be converted into an analog electrical signal indicative of such sound pressure. A MEMS microphone may include an intrinsic highpass filter set by a volume of air in the microphone, analogous to an electrical capacitance, and an acoustic leakage through the microphone membrane, analogous to an electrical resistance. Such intrinsic highpass filter may be characterized by a cutoff frequency $f_{3\ db}$ at which an output power of the intrinsic highpass filter is less than half of its pass-band value (also known as a 3-decibel or 3-dB cutoff frequency). For example, a cutoff frequency $f_{3\ db}$ of an intrinsic highpass filter may be given by $f_{3\ db}=f_0\pm\Delta f$ where $f_0$ is a nominal cutoff frequency and $\Delta f$ defines an error range by which an actual cutoff frequency may vary from the nominal cutoff frequency.

Specifications for MEMS microphones to be used in various applications may require smaller error ranges for the cutoff frequency than can be provided by MEMS microphones. For example, a MEMS microphone may have a cutoff frequency $f_{3\ db}$=35 Hz±10 Hz, but systems requirements for an electronic system comprising the MEMS microphone may have a requirement of a target cutoff frequency of $f_{target}$=35 Hz±4.5 Hz. Accordingly, systems and methods for effectively reducing an error range of the cutoff frequency of a MEMS microphone's intrinsic highpass filter may be desirable.

SUMMARY

In accordance with the teachings of the present disclosure, certain disadvantages and problems associated with existing audio systems including MEMS microphones may be reduced or eliminated.

In accordance with embodiments of the present disclosure, a system may include a digital correcting network for correcting for an intrinsic highpass filter of a microelectromechanical systems (MEMS) microphone such that a combined phase and magnitude response of a cascade of the intrinsic highpass filter and the digital correcting network substantially approximates the response of a target highpass filter.

In accordance with these and other embodiments of the present disclosure, a method may include correcting for an intrinsic highpass filter of a microelectromechanical systems (MEMS) microphone with a digital correcting network such that a combined phase and magnitude response of a cascade of the intrinsic highpass filter and the digital correcting network substantially approximates the response of a target highpass filter.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates a table setting forth values of a scaling factor for various 3-dB cutoff frequencies of the intrinsic highpass filter of a microphone transducer, in accordance with embodiments of the present disclosure;

DETAILED DESCRIPTION

Figure 1:
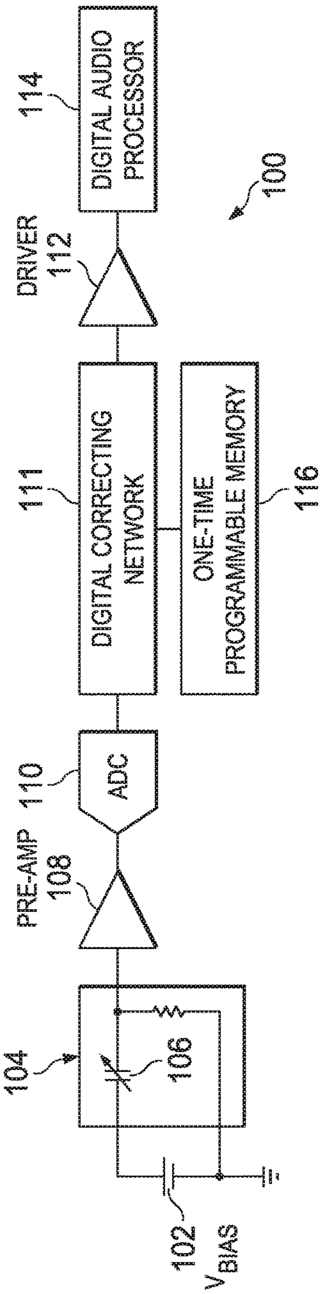
FIG. 1 illustrates a block diagram of selected components of an example audio system, in accordance with embodiments of the present disclosure.

FIG. 1 illustrates a block diagram of selected components of an example audio system 100, in accordance with embodiments of the present disclosure. As shown in FIG. 1, audio system 100 may include an analog signal path portion comprising bias voltage source 102, a microphone transducer 104, analog pre-amplifier 108, a digital path portion comprising an analog-to-digital converter (ADC) 110, a digital correcting network 111, a driver 112, a digital audio processor 114, and a one-time programmable memory 116.

Bias voltage source 102 may comprise any suitable system, device, or apparatus configured to supply microphone transducer 104 with a direct-current bias voltage $V_{BIAS}$, such that microphone transducer 104 may generate an electrical audio signal. Microphone transducer 104 may comprise any suitable system, device, or apparatus configured to convert sound incident at microphone transducer 104 to an electrical signal, wherein such sound is converted to an electrical analog input signal using a diaphragm or membrane having an electrical capacitance (modeled as variable capacitor 106 in FIG. 1) that varies based on sonic vibrations received at the diaphragm or membrane. Microphone transducer 104 may include a MEMS microphone, or any other suitable capacitive microphone. Pre-amplifier 108 may receive the analog input signal output from microphone transducer 104 and may comprise any suitable system, device, or apparatus configured to condition the analog audio signal for processing by ADC 110.

ADC 110 may receive a pre-amplified analog audio signal output from pre-amplifier 108, and may comprise any suitable system, device, or apparatus configured to convert the pre-amplified analog audio signal received at its input to a digital signal representative of the analog audio signal generated by microphone transducer 104. ADC 110 may itself include one or more components (e.g., delta-sigma modulator, decimator, etc.) for carrying out the functionality of ADC 110. Digital correcting network 111 may receive the digital signal output by ADC 110 and may comprise any suitable system, device, or apparatus configured to correct for an intrinsic highpass filter of microphone transducer 104 such that a combined phase and magnitude response of a cascade of the intrinsic highpass filter and digital correcting network 111 substantially approximates the response of a target highpass filter, as described in greater detail below. Driver 112 may receive the digital signal output by digital correcting network 111 and may comprise any suitable system, device, or apparatus configured to condition such digital signal (e.g., encoding into Audio Engineering Society/European Broadcasting Union (AES/EBU), Sony/Philips Digital Interface Format (S/PDIF), or other suitable audio interface standards), in the process generating a digitized microphone signal for transmission over a bus to digital audio processor 114.

Once converted to the digitized microphone signal, the digitized microphone signal may be transmitted over significantly longer distances without being susceptible to noise as compared to an analog transmission over the same distance. In some embodiments, one or more of bias voltage source 102, pre-amplifier 108, ADC 110, and driver 112 may be disposed in close proximity with microphone transducer 104 to ensure that the length of the analog signal transmission lines are relatively short to minimize the amount of noise that can be picked up on such analog output lines carrying analog signals. For example, in some embodiments, one or more of bias voltage source 102, microphone transducer 104, pre-amplifier 108, ADC 110, and driver 112 may be formed on the same integrated circuit die or substrate.

Digital audio processor 114 may comprise any suitable system, device, or apparatus configured to process the digitized microphone signal for use in a digital audio system. For example, digital audio processor 114 may comprise a microprocessor, microcontroller, digital signal processor (DSP), application specific integrated circuit (ASIC), or any other device configured to interpret and/or execute program instructions and/or process data, such as the digitized microphone signal output by driver 112.

One-time programmable memory 116 may be communicatively coupled to digital correcting network 111 and may comprise any suitable system, device, or apparatus configured to store coefficients for digital correcting network 111 and provide coefficients to digital correcting network 111, as described in greater detail below.

Although FIG. 1 depicts a particular architecture for audio system 100, in some embodiments, digital correcting network 111 and/or one-time programmable memory 116 may reside at a different location within the digital path portion of audio system 100. For example, in some embodiments, digital correcting network 111 and/or one-time programmable memory 116 may reside within or be implemented by digital audio processor 114 (in which case driver 112 may receive the output of ADC 110).

To further illustrate the structure and functionality of digital compensating network 111, assume that a target filter is a resistive-capacitive circuit satisfying:

$$f_{target} = \frac{1}{2\pi RC} \quad \text{[eqn. 1]}$$

where $f_{target}$ is a target cutoff frequency, and R and C represent an equivalent resistance and capacitance, respectively, for the target filter. With a target cutoff frequency $f_{target}$, and a known sampling frequency $F_s$ of ADC 110, a target filter may be modeled as a first-order Butterworth highpass filter with a normalized cutoff frequency of $f_B=f_{target}/(F_s/2)$. For purposes of discussion, assuming target cutoff frequency $f_{target}$=35 Hz and sampling frequency $F_s$=3 MHz, the transfer function of the first-order Butterworth highpass filter may be given as:

$$H_{target}(z) = \frac{0.999963349429005(1 - z^{-1})}{1 - 0.999926698858011z^{-1}} \quad \text{[eqn. 2]}$$

Further assuming an error Δf=±10 Hz for the cutoff frequency of the intrinsic highpass filter, the transfer function of the first-order Butterworth highpass filter corresponding to the minimum actual cutoff frequency (e.g., 25 Hz) of the intrinsic highpass filter may be given as:

$$H_L(z) = \frac{0.999973820746585(1 - z^{-1})}{1 - 0.999947641493171z^{-1}} \quad \text{[eqn. 3]}$$

while the transfer function of the first-order Butterworth highpass filter corresponding to the maximum actual cutoff frequency (e.g., 45 Hz) of the intrinsic highpass filter may be given as:

$$H_U(z) = \frac{0.999952878330718(1 - z^{-1})}{1 - 0.999905756661435z^{-1}} \quad \text{[eqn. 4]}$$

Figure 2A:
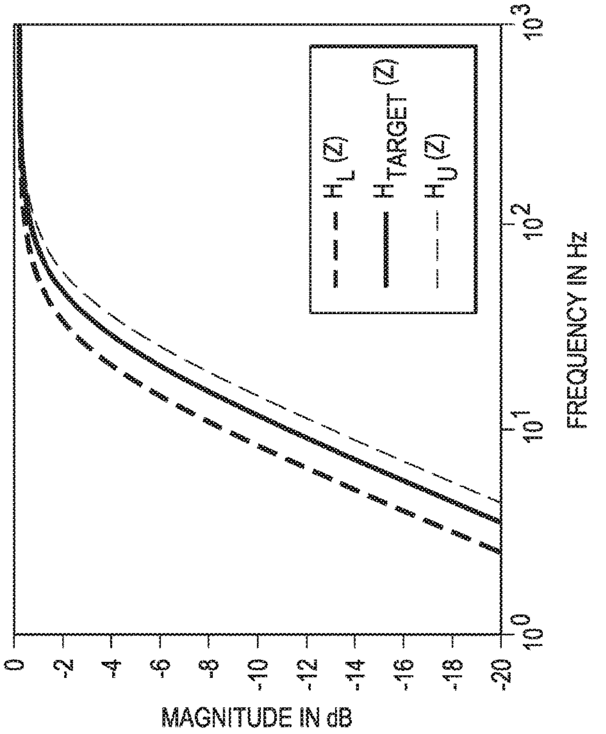
FIG. 2A illustrates a graph of magnitude versus frequency of various filter responses, in accordance with embodiments of the present disclosure.
Figure 2B:
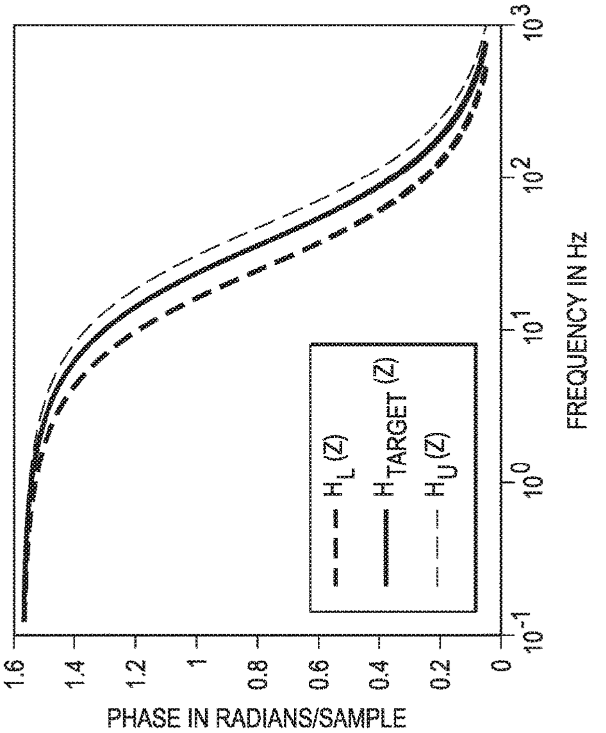
FIG. 2B illustrates a graph of phase versus frequency of various filter responses, in accordance with embodiments of the present disclosure.

FIG. 2A illustrates a graph of magnitude (in dB) versus frequency (in Hz) of the responses of $H_L(z)$, $H_{target}(z)$, and $H_U(z)$, while FIG. 2B illustrates a graph of phase (in radians per sample) versus frequency (in Hz) of the responses of $H_L(z)$, $H_{target}(z)$, and $H_U(z)$, in accordance with embodiments of the present disclosure. From FIGS. 2A and 2B, it is evident that in order for digital correcting network 111 to have a response $H_{DCN}(z)$ that when cascaded with the intrinsic highpass filter of microphone transducer 104 approximates the response of the target filter, digital correcting network 111 should have a response such that it: (a) shifts the magnitude response of the intrinsic highpass filter left or right, depending on whether the cutoff frequency of the intrinsic highpass filter is higher or lower than that of the target filter; and (b) shifts the phase response of the intrinsic highpass filter up or down in the frequency domain, depending on whether the cutoff frequency of the intrinsic highpass filter is higher or lower than that of the target filter. Accordingly, digital correcting network 111 may have tunable characteristics such that it has a lowpass filter-like response when the cutoff frequency of the intrinsic highpass filter is higher than that of the reference filter, and a highpass filter-like response when the cutoff frequency of the intrinsic highpass filter is lower than that of the reference filter.

It is known that if $H_{LP}(z)$ and $H_{HP}(z)$ are transfer functions of a lowpass and a highpass filter, respectively, that satisfy the power complementary condition:

$$|HLP(e^{j\omega})|^2+|HHP(e^{j\omega})|^2=1 \quad \text{[eqn. 5]}$$

then both filters have the same 3-dB cutoff frequency. Substituting $H_{target}(z)$ as set forth above for $H_{HP}(z)$ in the above equation and solving for $H_{LP}(z)$ (and assuming target cutoff frequency $f_{target}$=35 Hz and sampling frequency $F_s$=3 MHz), the transfer function of $H_{LP}(z)$ may be given as:

$$H_{LP}(z) = \frac{3.66505709946674 \times 10^{-5}(1+z^{-1})}{1-0.999926698858011z^{-1}} \quad \text{[eqn. 6]}$$

Therefore, by using an appropriate weighted combination of lowpass and highpass transfer functions, a tunable filter with varying magnitude and phase characteristics can be realized. In such an implementation, however, the lowpass and highpass filters are realized separately. However, such tunable filter may be implemented as a single filter. To illustrate, the lowpass and highpass filters satisfying eqn. 5 above also satisfy the following conditions:

$$H_{LP}(z)=\tfrac{1}{2}(A_0(z)+A_1(z)) \quad \text{[eqn. 7]}$$

$$H_{HP}(z)=\tfrac{1}{2}(A_0(z)-A_1(z)) \quad \text{[eqn. 8]}$$

Where $A_0(z)$ and $A_1(z)$ are stable allpass filters. Allpass filters may be implemented in a structurally lossless manner. In other words, if the coefficients of the allpass filters are quantized, the allpass characteristics of such filters do not change. Also, such filters are known to have extremely low coefficient sensitivity and consequently, a small number of bits may be assigned to represent the coefficients. From eqns. 2, 6, 7, and 8, the following relationships may be observed:

$$A_0(z)=1 \quad \text{[eqn. 9]}$$

$$A_1(z) = \frac{d+z^{-1}}{1+dz^{-1}} \quad \text{[eqn. 10]}$$

Where d is a constant such that d=−0.099926698858011. Thus, responses $H_{LP}(z)$ and $H_{HP}(z)$ can be realized as:

$$H_{LP}(z)=\tfrac{1}{2}(1+A_1(z)) \quad \text{[eqn. 11]}$$

$$H_{HP}(z)=\tfrac{1}{2}(1-A_1(z)) \quad \text{[eqn. 12]}$$

Accordingly, the filters with responses $H_{LP}(z)$ and $H_{HP}(z)$ can be implemented using a single allpass filter $A_1(z)$ comprising a single multiplier.

By introducing a weighting parameter K, the tunable filter implementing digital correcting network 111 may have the response:

$$H_{DCN}(z) = \frac{K}{2}(1+A_1(z)) + \frac{1}{2}(1-A_1(z)) \quad \text{[eqn. 13]}$$

Figure 3:
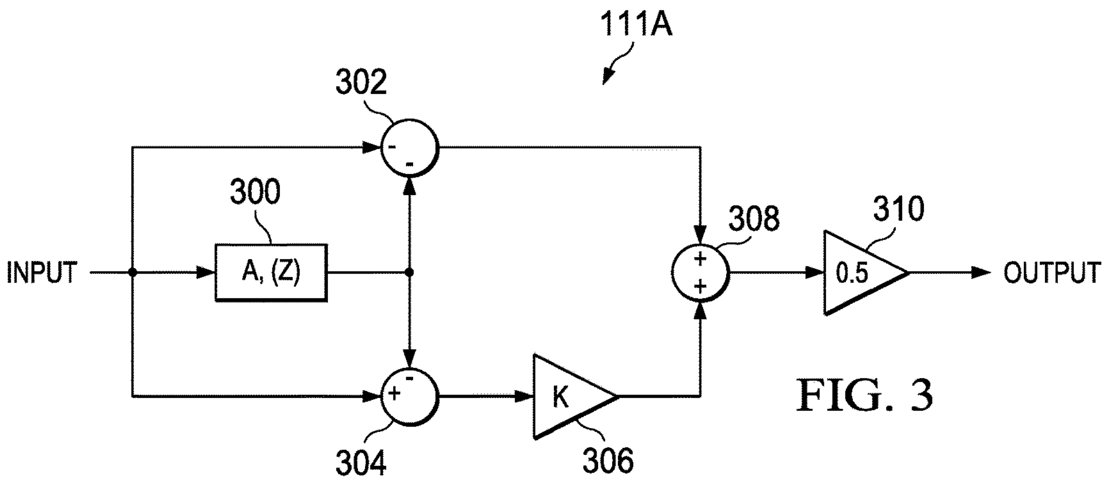
FIG. 3 illustrates an architecture for implementing a tunable filter that may be used to implement a digital correcting network, in accordance with embodiments of the present disclosure.

FIG. 3 illustrates an efficient architecture for implementing a tunable filter 111A that may be used to implement digital correcting network 111, in accordance with embodiments of the present disclosure. As shown in FIG. 3, an input signal may be filtered by allpass filter 300 having response $A_1(z)$. A combiner 302 may combine the output of allpass filter 300 with the input signal, and a combiner 304 may subtract the output of allpass filter 300 with the input signal. A gain element 306 may apply the scaling factor K to the output of combiner 304. A combiner 308 may combine the output of combiner 302 and gain element 306. A gain element 310 may apply a gain of 0.5 to the output of combiner 308, to generate an output signal of tunable filter 111A, such that the response $H_{DCN}(z)$ is applied to the input signal to generate the output signal.

FIG. 4 illustrates a table 400 setting forth values of scaling factor K for various 3-dB cutoff frequencies of the intrinsic highpass filter of microphone transducer 104, in accordance with embodiments of the present disclosure. Table 400 also depicts, for each of the various 3-dB cutoff frequencies, a corresponding normalized amplitude $A(f_{target})$ at the target frequency $f_{target}$ (e.g., 35 Hz in this example) and a corresponding error amplitude $E(f_{target})$ which reflects the difference between normalized amplitudes of the target filter and the intrinsic highpass filter at the target frequency $f_{target}$ (e.g., 35 Hz in this example).

Values of scaling factor K may be obtained using a one-dimensional nonlinear optimization technique by minimizing:

$$\min_K \int_0^{\pi} |H_{DCN}(e^{j\omega})H_{int}(e^{j\omega})-H_{target}(e^{j\omega})|^2 d\omega \quad \text{[eqn. 14]}$$

where $H_{int}(z)$ is the response of the intrinsic highpass filter of microphone transducer 104 and where:

$$H_{DCN}(z) = \frac{K+1+(K-1)d+(K-1+(K+1)d)z^{-1}}{1+dz^{-1}} \quad \text{[eqn. 15]}$$

In a real-life situation, solving for scaling factor K for any characteristic of the intrinsic highpass filter of microphone transducer 104 using nonlinear programming techniques may not be practical. However, analysis of table 400 shows that the relationship between scaling factor K and error amplitude $E(f_{target})$ may be approximated by a quadratic polynomial function. For example, assuming a target cutoff frequency of $f_{target}$=35 Hz and an error amplitude $E_{35\ Hz}$ at the target frequency $f_{target}$ for the intrinsic highpass filter, scaling factor K may be approximated by:

$$K(E_{35\ Hz})=1.90935224715264E_{35\ Hz}^2-2.86589545024937E_{35\ Hz}+1.0001841649729 \quad \text{[eqn. 16]}$$

Figure 5:
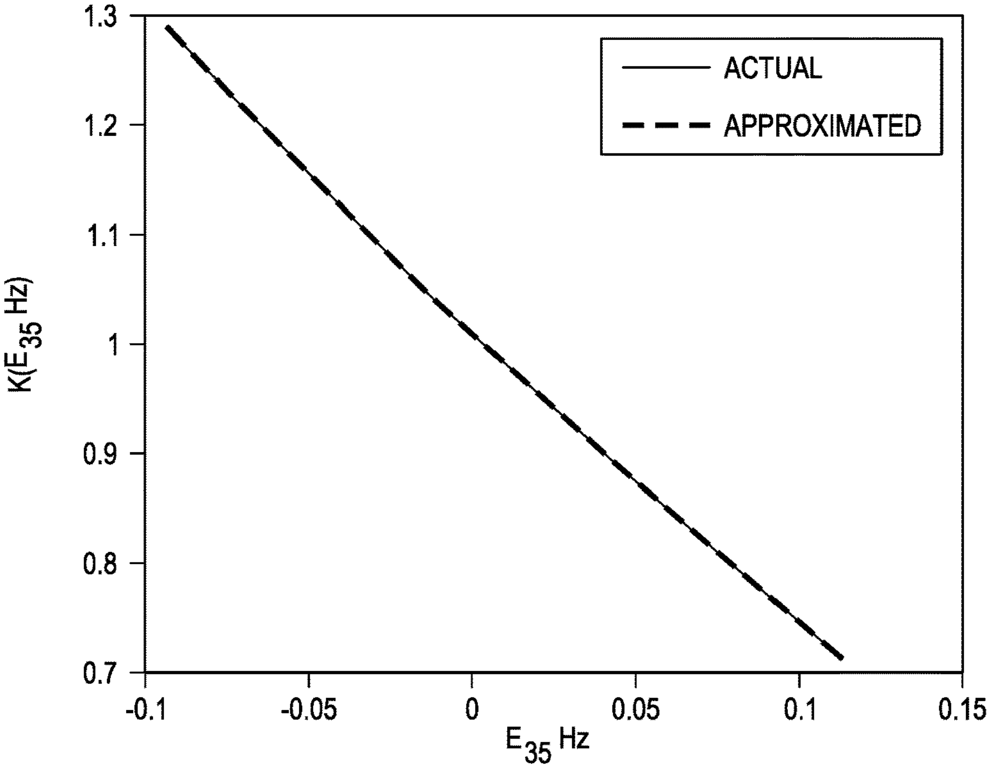
FIG. 5 illustrates a graph depicting an actual value of a scaling factor versus magnitude error and the approximated value of a scaling factor versus magnitude error, in accordance with embodiments of the present disclosure.

FIG. 5 illustrates a graph depicting the actual value of $K(E_{35\ Hz})$ versus $E_{35\ Hz}$ and the approximated value of $K(E_{35\ Hz})$ versus $E_{35\ Hz}$ as given by eqn. 16, in accordance with embodiments of the present disclosure. The variation between the curve for the actual value of $K(E_{35\ Hz})$ versus $E_{35\ Hz}$ and the curve for the approximated value of $K(E_{35\ Hz})$ versus $E_{35\ Hz}$ corresponds to a value of constant d=−0.999926698858011. The two parameters present in digital correcting network 111 that may be modified are scaling factor K and the constant d. If the value of constant d is quantized to a value $d_q=-1+2^{-14}=-0.9993896484375$ using Canonic Signed Digit representation, constant d may be represented by a quantized value $d_q$ requiring only a single addition and a single shift by a power of two. Accordingly, such quantization of $d_q$ can lead to a more efficient implementation of an allpass filter for implementing digital correcting network 111.

Figure 6:
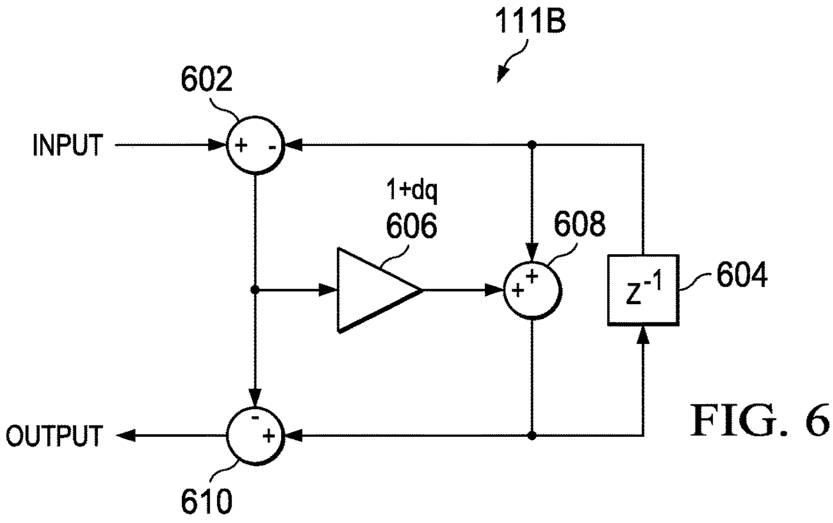
FIG. 6 illustrates another architecture for implementing a tunable filter that may be used to implement a digital correcting network, in accordance with embodiments of the present disclosure.

For example, FIG. 6 illustrates an architecture for implementing a tunable filter 111B that may be used to implement digital correcting network 111, in accordance with embodiments of the present disclosure. As shown in FIG. 6, a combiner 602 may subtract an output of a delay block 604 from an input signal. A gain element 606 may apply a gain 1+d to the output of combiner 602. A combiner 608 may combine the output of delay block 604 to the output of gain element 606. Delay block 604 may impose a delay to the output of combiner 608. A combiner 610 may subtract the output of combiner 602 from the output of combiner 608 to generate an output signal. In the architecture of FIG. 6, the coefficient of the allpass filter is in the form of $1+d_q$. If $d_q=-1+2^{-14}$, then $1+d_q=2^{-14}$. Hence, the coefficient of the allpass filter can be realized by a single shift operation.

With the value of constant d fixed to $d_q$, the values of scaling factor K may be obtained in the same manner as described earlier with respect to eqn. 14 except that the value of constant d in eqn. 15 is now the quantized value $d_q$. The variation of scaling factor K with error amplitude $E_{35\ Hz}$ may now be approximated by:

$$K(E_{35\ Hz})=2.41014832270696E_{35\ Hz}^2-3.27794637545768E_{35\ Hz}+1.00020260601088 \quad \text{[eqn. 17]}$$

The resulting value of scaling factor K may be quantized to a number of bits (e.g., 3 bits). The quantized value of scaling factor K, $K_q$, in conjunction with quantized value $d_q$ may be used in eqn. 15, yielding the transfer function:

$$H_{DCN}(z)=\frac{K_q+1+(K_q-1)d_q+(K_q-1+(K_q+1)d_q)z^{-1}}{1+d_qz^{-1}} \quad \text{[eqn. 18]}$$

Figure 7:
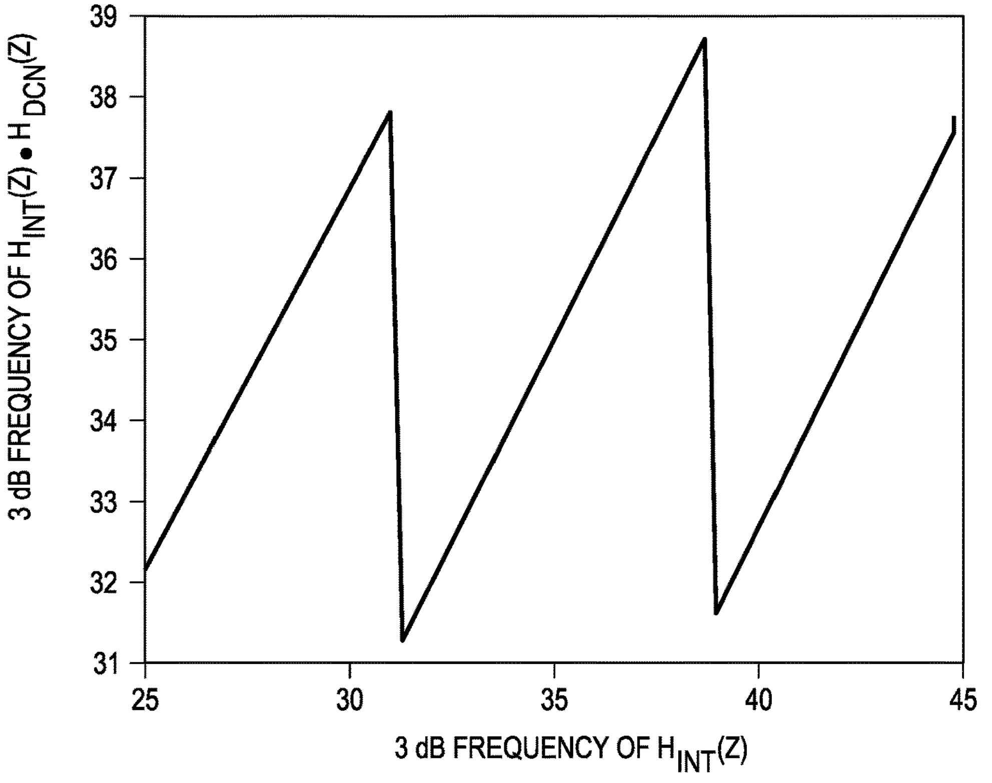
FIG. 7 illustrates a graph depicting the 3-db cutoff frequency of a response which is a cascade of a response of an intrinsic highpass filter of a microphone transducer and a response of a digital correcting network, in accordance with embodiments of the present disclosure.

FIG. 7 illustrates a graph depicting the 3-db cutoff frequency of a response which is a cascade of response $H_{int}(z)$ of the intrinsic highpass filter and response $H_{DCN}(z)$ as given in eqn. 18 (assuming quantized value $K_q$ quantized to three bits) versus the 3-db cutoff frequency of response $H_{int}(z)$, assuming a target frequency of $f_{target}$=35 Hz. FIG. 7 shows that the 3-db cutoff frequencies of the cascaded response are within ±4 Hz of the target frequency $f_{target}$=35 Hz. Accordingly, if a specification required a 3-db frequency of 35 Hz±4.5 Hz, such cascaded response would meet such specification using microphone transducer 104 having a higher error range than ±4.5 Hz from the target frequency $f_{target}$. Even more precision could be obtained by quantizing quantized value $K_q$ to more bits.

As a particular example of the entire operation of setting coefficients for the allpass filter of digital correcting network 111, assume that the 3-db cutoff frequency of the intrinsic highpass filter of microphone transducer 104 is 27.875 Hz, and the target 3-db cutoff frequency is 35 Hz. Such cutoff frequency may be determined by, for example, offline testing and characterization of microphone transducer 104. A value of $E_{35\ Hz}$ for intrinsic highpass filter of $E_{35\ Hz}$= 0.075122939804705 may be obtained. Using eqn. 17, a value of K may be obtained (e.g., K=0.767552359530714), which may be rounded to three bits (e.g. $K_q$=0.75). Such quantized value $K_q$ may be used in eqn. 18 to realize the allpass filter of digital correcting network 111. The 3-db cutoff frequency of the cascaded intrinsic highpass filter and allpass filter of digital correcting network 111 in this example may be 34.8469861269317 Hz, within specification limits.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:

an input for receiving an input signal from a microelectromechanical systems (MEMS) microphone; and a digital correcting network for correcting for an intrinsic highpass filter of the MEMS microphone such that a combined phase and magnitude response of a cascade of the intrinsic highpass filter and the digital correcting network substantially approximates the response of a target highpass filter, wherein the digital correcting network includes:

an all-pass filter coupled to the input;

a first combiner configured to combine an output of the all-pass filter with the input signal;

a second combiner configured to determine a difference between the output of the all-pass filter and the input signal; and a third combiner configured to combine signals that are based on respective outputs of the first and second combiners to determine an output signal.

2. The system of claim 1, wherein the digital correcting network is configured to correct for a corner frequency of the intrinsic highpass filter being above or below a target corner frequency.

3. The system of claim 1, further comprising a one-time programmable memory communicatively coupled to the digital correcting network for providing coefficients to the digital correcting network.

4. The system of claim 1, wherein the digital correcting network has a response of a low-pass filter.

5. The system of claim 1, wherein the digital correcting network has a response of a highpass filter.

6. The system of claim 1, wherein the digital correcting network has a combined response of a low-pass filter and a highpass filter.

7. The system of claim 1, wherein:
- the first combiner is implement as a first exactly one combiner;
- the second combiner is implement as a second exactly one combiner; and
- the third combiner is implement as a third exactly one combiner.

8. The system of claim 6, wherein parameters of the digital correcting network are quantized to obtain a hardware-efficient implementation of the digital correcting network.

9. The system of claim 6, wherein the all-pass filter is configured to implement the combined response of the low-pass filter and the highpass filter.

10. The system of claim 9, wherein parameters of the all-pass filter are determined using a nonlinear optimization technique.

11. The system of claim 9, wherein parameters of the all-pass filter are determined from a quadratic equation.

12. The system of claim 9, wherein parameters of the digital correcting network are quantized to obtain a hardware-efficient implementation of the digital correcting network.

13. A method comprising:
- receiving, at an input, an input signal from a microelectromechanical systems (MEMS) microphone;
- correcting for an intrinsic highpass filter of the MEMS microphone with a digital correcting network such that a combined phase and magnitude response of a cascade of the intrinsic highpass filter and the digital correcting network substantially approximates the response of a target highpass filter, wherein the digital correcting network includes:

- an all-pass filter coupled to the input;
  - a first combiner configured to combine an output of the all-pass filter with the input signal;
  - a second combiner configured to determine a difference between the output of the all-pass filter and the input signal; and
  - a third combiner configured to combine signals that are based on respective outputs of the first and second combiners to determine an output signal.

14. The method of claim 13, wherein correcting comprises correcting for a corner frequency of the intrinsic highpass filter being above or below a target corner frequency.

15. The method of claim 13, further comprising providing coefficients to the digital correcting network by a one-time programmable memory communicatively coupled to the digital correcting network.

16. The method of claim 13, wherein the digital correcting network has a response of a low-pass filter.

17. The method of claim 13, wherein the digital correcting network has a response of a highpass filter.

18. The method of claim 13, wherein the digital correcting network has a combined response of a low-pass filter and a highpass filter.

19. The method of claim 13, wherein:
- the first combiner is implement as a first exactly one combiner;
- the second combiner is implement as a second exactly one combiner; and
- the third combiner is implement as a third exactly one combiner.

20. The method of claim 18, further comprising quantizing parameters of the digital correcting network to obtain a hardware-efficient implementation of the digital correcting network.

21. The method of claim 18, wherein the all-pass filter is configured to implement the combined response of the low-pass filter and the highpass filter.

22. The method of claim 21, further comprising determining parameters of the all-pass filter using a nonlinear optimization technique.

23. The method of claim 21, further comprising determining parameters of the all-pass filter from a quadratic equation.

24. The method of claim 21, further comprising quantizing parameters of the digital correcting network to obtain a hardware-efficient implementation of the digital correcting network.

* * * * *